(12) United States Patent
Eckel et al.

(10) Patent No.: US 7,182,978 B2
(45) Date of Patent: Feb. 27, 2007

(54) METHOD AND DEVICE FOR THE PREVENTION OF WALL ADHERENCES IN SHAFTS ON THE INTRODUCTION OF PARTICLES

(75) Inventors: Ägidius Eckel, Niederkirchen (DE); Jens Hoferichter, Mannheim (DE); Rainer Schlichtmann, Ludwigshafen (DE); Josef Barban, Neuleiningen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 729 days.

(21) Appl. No.: 10/257,716

(22) PCT Filed: Apr. 18, 2001

(86) PCT No.: PCT/EP01/04379

§ 371 (c)(1),
(2), (4) Date: Oct. 16, 2002

(87) PCT Pub. No.: WO01/83120

PCT Pub. Date: Nov. 8, 2001

(65) Prior Publication Data

US 2003/0080225 A1    May 1, 2003

(30) Foreign Application Priority Data

Apr. 28, 2000 (DE) .............................. 100 205 798
Apr. 28, 2000 (DE) .............................. 100 205 836

(51) Int. Cl.
*B05D 7/22* (2006.01)

(52) U.S. Cl. .................. 427/230; 427/236; 427/239
(58) Field of Classification Search ................ 427/230, 427/236, 239
See application file for complete search history.

(56) References Cited

U.S. PATENT DOCUMENTS

| 2,010,049 | A | * | 8/1935 | Abbott, Jr. et al. ............... 73/8 |
| 3,098,332 | A | * | 7/1963 | Sutton ........................ 451/453 |
| 3,849,176 | A | * | 11/1974 | Asano et al. ................ 428/626 |
| 3,991,944 | A | * | 11/1976 | Baikoff ........................ 241/36 |
| 4,425,381 | A | * | 1/1984 | Walsh ........................ 427/181 |
| 4,770,741 | A | * | 9/1988 | Day ........................ 156/394.1 |
| 6,486,249 | B1 | * | 11/2002 | Dituro et al. ................ 524/388 |

FOREIGN PATENT DOCUMENTS

| JP | 2003-206301 | * | 7/2006 |
| WO | WO 99/54413 A1 | * | 10/1999 |

OTHER PUBLICATIONS

Echte, Rubber-Toughened Styrene Polymers: A review, ACS Symposium Series 222. Am. Chem. Soc., 1999.*

* cited by examiner

*Primary Examiner*—William Phillip Fletcher, III
(74) *Attorney, Agent, or Firm*—Novak Druce & Quigg LLP

(57) ABSTRACT

A process for inhibiting agglutination in an upright duct when particles are introduced, where at least some parts of the walls of the upright duct are wetted with a film of liquid, and where the liquid used includes a dispersing agent or solvent appropriate for the rubber.

8 Claims, 3 Drawing Sheets

Figure 1:
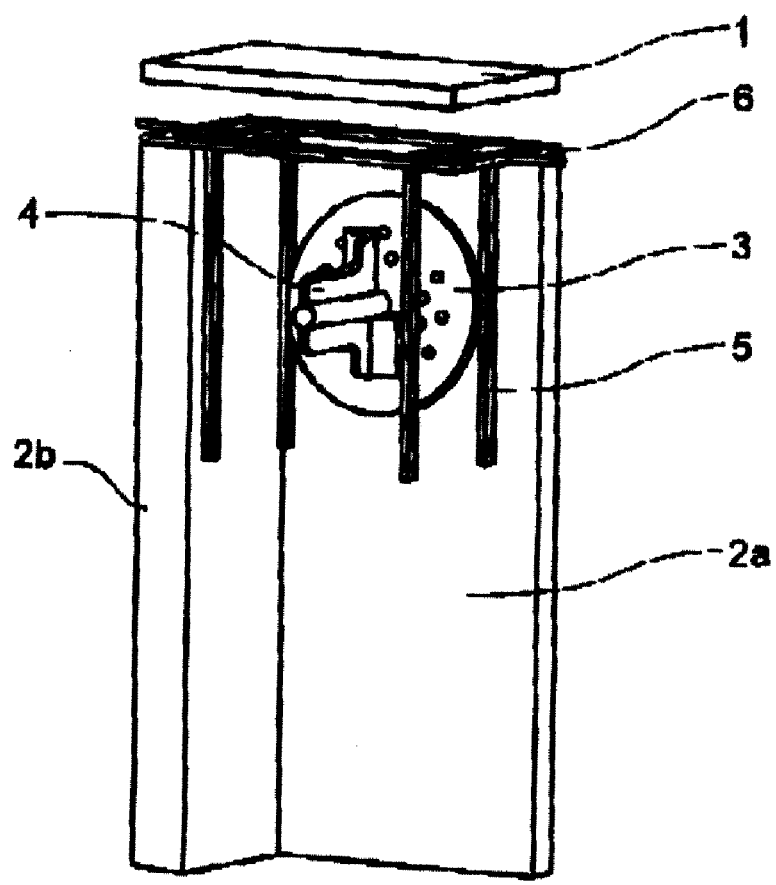

METHOD AND DEVICE FOR THE PREVENTION OF WALL ADHERENCES IN SHAFTS ON THE INTRODUCTION OF PARTICLES

The invention relates to a process for inhibiting agglutination in an upright duct when particles are introduced, and to an apparatus for carrying out the process.

When impact-modified polystyrene or styrene copolymers are prepared, a rubber solution in styrene is introduced into the polymerization plants. Rubber bales are comminuted to allow dissolution of the rubber. The rubber is comminuted by being pressed through a perforated plate, followed by die-face cutting, using a rotating knife. The rubber particles pass via an upright duct into the dissolution tank with styrene (A. Echte, Rubber-toughened styrene polymers, A Review, ACS Symposium Series 222, American Chemical Society: Washington, D.C., 1989, p. 15).

The rotating motion of the knife means that many of the rubber particles are not projected vertically through the upright duct into the dissolution tank but thrown against the upright duct wall, to which they adhere to a degree which depends on the tackiness of the rubber. In extreme cases, these accumulations can completely block the path through the upright duct. One consequence of this is shutdown of the comminution unit, and associated disruption of the entire polymerization plant.

A preventive measure used to avoid this is cleaning of the upright duct walls at regular intervals. This cleaning work consumes time and manpower. The work has to be carried out using respiratory protection if there is any likelihood of monomer emissions.

The use of conventional auxiliaries, such as pulverulent Zn stearate or mineral oil, added during the comminution process, has been proposed in order to reduce the tackiness of the rubber. Since the substances used have to be those which do not impair the properties of the impact-modified polystyrene product to be prepared, there is a wide variety of auxiliaries which cannot be added for technical reasons or for reasons of cost or can be added only in limited amounts. Especially when the type of rubber used is highly adhesive or the upright duct is long, the amounts of powder or mineral oil needed are very large.

It has also been proposed that the upright duct walls can be given an antiadhesive coating. A disadvantage here, however, is that both layers of this type can very easily be removed by scraping and can be damaged during cleaning by mechanical means.

Another possibility would be to use a spray jet to detach the agglutinated material. The spray mist can produce an atmosphere which has a greatly increased concentration of solvents or of monomers and which can require additional preventive safety measures. Experience has shown that the nozzle openings rapidly block and impair the effectiveness of the nozzles. Cleaning of the nozzles is not possible, since there is no access to the upright duct during the production process. In addition, the nozzles project into the upright duct and can be broken off or damaged, and can cause sparking, during any cleaning procedure which uses mechanical aids. If the nozzles are installed from outside, holes would have to be made through the upright duct wall.

It is an object of the present invention to develop a low-cost, flexible and reliable process for inhibiting agglutination on the walls of upright ducts when particles, in particular rubber particles, are introduced, and to develop an apparatus for carrying out the process which does not have the abovementioned disadvantages. The apparatus should in particular be capable of rapid and simple incorporation into existing plants without sacrificing productivity and without complicated modifications, it should also be capable of being removed again, if desired.

We have found that this object is achieved by means of a process for inhibiting agglutination in an upright duct when particles are introduced, where the walls of the upright duct are wetted with a film of liquid.

The film of liquid may be formed by directing a liquid tangentially to the walls of the upright duct via tubes which have longitudinal slits at the lower end.

In another embodiment of the invention, at least portions of the walls of the upright duct may be designed as a porous sheet and may be wetted with a film of liquid.

One example of a suitable porous sheet is a sintered metal sheet. This permits the process of wetting with a film of liquid to be carried out without jets or sprays.

Another way of forming a film of liquid is by directing a liquid tangentially to the walls of the upright duct via tubes which have longitudinal slits.

The particles may be produced via a comminution apparatus and introduced into the upright duct.

The process is particularly suitable for tacky particles, in particular for rubber particles, such as polybutadiene rubbers or polyacrylate rubbers. The liquid preferred in this instance for the film of liquid is a dispersing agent or solvent appropriate for the rubber, preferably styrene, aliphatic or cycloaliphatic hydrocarbons, e.g. cyclohexane, or aromatic hydrocarbons, such as benzene, toluene or ethylbenzene, or mixtures of styrene with aliphatic or aromatic hydrocarbons, in particular styrene/ethylbenzene mixtures.

It is particularly preferable for at least part of the solvent or dispersant to be charged together with the rubber particles via an upright duct into a dissolution tank, and for at least some parts of the walls of the upright duct to be wetted with a film of liquid. In this way, very large amounts of liquid can be used to prevent agglutination in the upright duct without additional dilution of the rubber solution. For continuously operated dissolution vessels with level control, a proven method is to divide the total flow of solvent into from 1 to 50% by volume, preferably from 1 to 30% by volume, in particular from 5 to 15% by volume, for the film of liquid in the wall of the upright duct, and from 99 to 50% by volume, preferably from 99 to 70% by volume, in particular from 95 to 85% by volume, for direct introduction into the dissolution tank. When styrene is used as main solvent component, the stream of solvent is generally preheated to about 40–80° C.

FIG. 1 shows an apparatus suitable for carrying out the process of the invention and inserted into, and suspended in, an upright duct (2) with lid (1). The apparatus essentially consists of tubes (5) which can be inserted, freely suspended, into an upright duct and can be filled with a liquid and which have been arranged along the walls of the upright duct (2a, 2b) and have a feed (6) and have discharge openings (7).

Figure 2:
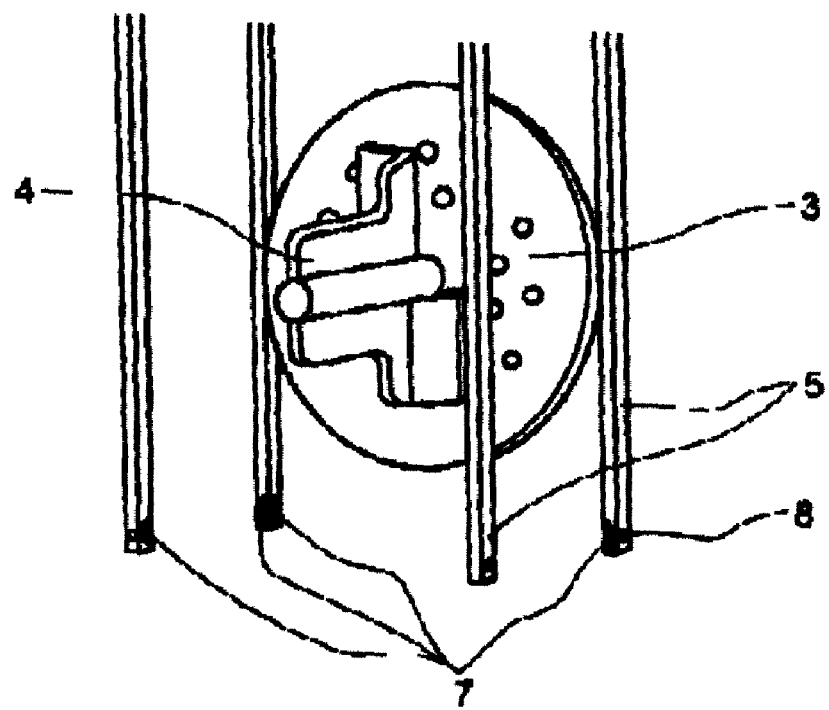

FIG. 2 shows an enlargement, with the lower ends of the tubes, and with the discharge openings (7) and (8). The shape selected for the discharge openings (7) is advantageously such that under the process conditions overlapping films of liquid form and entirely wet the wall of the upright duct below the discharge opening. The admission pressure set is such as to cause discharge from the discharge openings of the amount of liquid needed for the wetting process. An admission pressure of from about 2 to 3 bar for the liquid is generally sufficient.

The size selected for the outlet openings (7) is preferably such as firstly to inhibit any blocking and secondly to inhibit any splashing of liquid.

The number and arrangement of the discharge openings (7), and the length of the tubes (5) depend on the shape of the upright duct and on the location of any severe agglutination. The design preferably has the discharge openings (7) as longitudinal slits measuring about 2×40 mm to the lower end of the tubes, the arrangement of the longitudinal slits being such that the liquid is directed tangentially to the walls of the upright duct (2a, 2b). The tubes (5) may have additional discharge openings (8) directed toward the walls of the upright duct (2a, 2b).

The cross section of the tubes (5) may be as desired, and preference is given to using tubes whose cross section is round, rectangular or equilateral polygonal, for example triangular, square or hexagonal. A square or rectangular cross section for the tubes here has proven particularly advantageous for optimizing the cleaning process.

The number of the tubes and their arrangement along the walls of the upright duct depend essentially on the shape of the upright duct. If the duct is of square or rectangular shape, the preferred arrangement of the tubes is in the four corners of the upright duct.

The feed (6), and also the feed (9), may advantageously be designed as a supporting and distributing rack via which the tubes (5) and, respectively, the chamber (11) are supplied with liquid. The supporting and distributing rack may simply be installed between the end of the upright duct and the lid.

The discharge openings (7) of the tubes (5) are generally arranged below an apparatus for feeding particles, for example one designed as a perforated plate (3) with a rotating knife (4).

Figure 3:
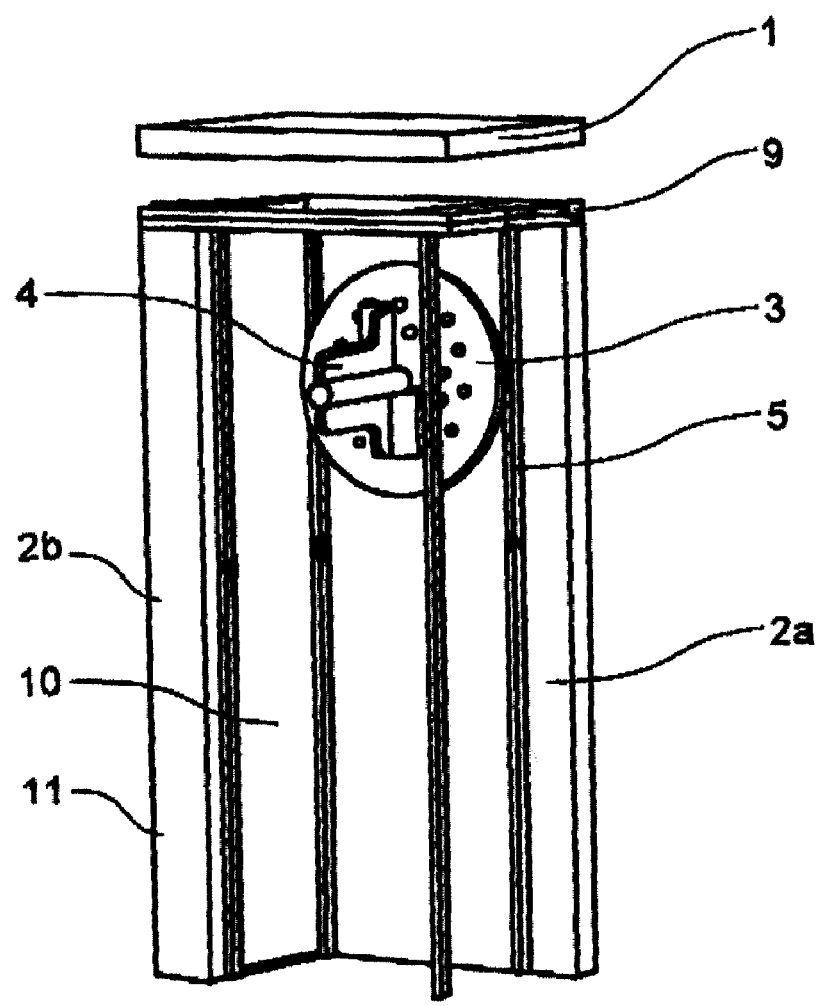

FIG. 3 shows an apparatus suitable for carrying out the process of the invention, which is inserted, freely suspended, into an upright duct (2) and which comprises a lid (1). The apparatus essentially consists of an anterior panel (10), at least part of which is composed of a porous sheet and which has been arranged in front of at least part of the walls of the upright duct (2a, 2b) and which forms with these a chamber (11) which can be filled with a liquid, where the apparatus also embraces a feed (9).

This embodiment is particularly advisable when adapting an existing plant. In order to avoid excessive narrowing of the opening of the upright duct, the thickness of the chamber (11) which can be filled with liquid is generally selected in the range from about 0.5 to 2 cm.

However, it is also possible for some or all of the walls of the upright duct to be designed as a porous sheet.

The apparatus of the invention may additionally comprise tubes (5) which can be inserted, freely suspended, into an upright duct and can be filled with a liquid and which have been arranged along the walls of the upright duct (2a, 2b) and have a feed (6) and have discharge openings (7).

The tubes (5) may, for example, serve simultaneously as frame for the anterior panel (10), at least part of which is composed of a porous sheet. The porous sheet is preferably installed in the region of the feed apparatus.

The film of liquid is effective in the process of the invention in inhibiting the agglutination of rubber particles which arrive at the wall of the upright duct as a result of the rotation of the wiper knife.

Another great advantage of the apparatus of the invention is that it can be assembled and dismantled simply and rapidly at any time without shutting down the plant and without having to roll or cut holes in the upright duct, or place inserts into the same. Existing assemblies can be adapted without complicated extension or modification, and without any significant shutdown time, permitting the processing of even high-tack varieties of rubber.

The apparatus permits the film of liquid to be directed specifically at locations with severe agglutination, and is even suitable for upright ducts of elongate shape.

EXAMPLE 1

An apparatus as in FIG. 1 was installed into a duct, about 1,900 mm in length, of a rubber dissolution apparatus with a clear cross section of 600×300 mm. The tubes (5) were produced from 20×20 mm square tubes with wall thickness of 2 mm and length of 900 mm, and fitted precisely into the four corners of the upright duct. The frontal discharge openings (7) were designed as slits of length 15 mm, and their shape permits non-splash discharge of the liquid and wetting of a major area of the wall of the upright duct. The openings (8) facing toward the wall of the upright duct were constructed as holes with a diameter of 3 mm. The location of all of the discharge openings is at a depth of 850 mm measured from the upper edge of the upright duct.

A substream of about 1000 liters with a temperature of from 40–80° C. was removed from the feed of the dissolution tank and passed, at a flow pressure of about 1.5 bar, by way of the four tubes (5) to the walls of the vertical duct.

Wetting of the entire surface of the wall permitted longlasting avoidance of any adhesion of the comminuted rubber particles with resultant blocking of the vertical duct below the rotating knife.

EXAMPLE 2

An apparatus as in FIG. 3 was installed in an upright duct of length about 1,900 mm with a clear cross section of 600×300 mm. The two face sides (2b) were completely covered by paneling at a distance of 20 mm from the wall of the upright duct. The paneling of the upper 250 mm was constructed as a pressure chamber on both sides. The chamber wall toward the interior of the upright duct was formed by sintered metal sheets (10). The porosity of the sintered metal sheets is 31% and their thickness is 10 mm.

During operation, the pressure chamber was charged with oil, the inlet pressure being 1.5 bar. The amount of oil discharged from the sintered metal sheets which form the chamber wall is about 10 l/h per chamber, and this forms a coherent film of liquid across the sintered metal sheets, and also on the paneling-covered wall of the upright duct below the sintered metal sheets.

Even when using rubbers which have a marked tendency toward adhesion, the previous requirement for regular cleaning of the wall of the upright duct was entirely eliminated by this apparatus.

EXAMPLE 3

An arrangement which has proven particularly advantageous comprises both the apparatus described in Example 1 and that described in Example 2.

We claim:

1. A process for inhibiting agglutination in an upright duct, which comprises, when rubber particles are introduced, wetting the walls of the upright duct with a film of liquid, where the liquid used comprises a dispersing agent or solvent appropriate for the rubber.

2. A process as claimed in claim 1, wherein the film of liquid is formed by directing the liquid tangentially to the walls of the upright duct via tubes which have longitudinal slits at the lower end.

3. A process as claimed in claim 1, which comprises designing at least some parts of the walls of the upright duct as a porous sheet and wetting these with a film of liquid.

4. A process as claimed in claim 3, wherein a sintered metal sheet is used as a porous sheet.

5. A process as claimed in claim 3, wherein the film of liquid is also formed by directing the liquid tangentially to the walls of the upright duct via tubes which have longitudinal slits.

6. A process as claimed in claim 1, wherein the particles are produced via a comminution apparatus and thus introduced into the upright duct.

7. A process as claimed in claim 1, wherein the liquid used comprises styrene, aliphatic, cycloaliphatic or aromatic hydrocarbons, or a mixture of styrene with aliphatic, cycloaliphatic or aromatic hydrocarbons.

8. A process for preparing rubber solutions from rubber particles, which comprises adding at least some of the solvent together with the rubber particles via an upright duct into a dissolution tank, where at least some parts of the walls of the upright duct have been wetted with a film of liquid.

* * * * *

UNITED STATES PATENT AND TRADEMARK OFFICE
CERTIFICATE OF CORRECTION

PATENT NO. : 7,182,978 B2 Page 1 of 1
APPLICATION NO. : 10/257716
DATED : February 27, 2007
INVENTOR(S) : Eckel et al.

It is certified that error appears in the above-identified patent and that said Letters Patent is hereby corrected as shown below:

Title Page, Item (30) the Priority Data
        "100 205 798" and "100 205 836"

should read

--100 20 579.8-- and --100 20 583.6--, respectively.

Signed and Sealed this

Eighteenth Day of March, 2008

JON W. DUDAS
*Director of the United States Patent and Trademark Office*